United States Patent Office 3,755,483
Patented Aug. 28, 1973

3,755,483
VAPOR-PHASE ALKYLATION IN PRESENCE OF CRYSTALLINE ALUMINOSILICATE CATALYST
George Thomas Burress, Beaumont, Tex., assignor to Mobile Oil Corporation
No Drawing. Filed Apr. 28, 1972, Ser. No. 248,365
Int. Cl. C07c 3/52
U.S. Cl. 260—671 R                    10 Claims

ABSTRACT OF THE DISCLOSURE

A process is provided for alkylation of aromatic hydrocarbons by contacting same with an alkylating agent in a reaction zone maintained under conditions such that said alkylation is accomplished in the vapor-phase and in the presence of a catalyst comprising a crystalline aluminosilicate zeolite characterized by a unique X-ray diffraction pattern, said catalyst under said conditions being capable of affording a high and selective yield of desired alkylaromatic product.

BACKGROUND OF THE INVENTION

Field of the invention

This invention is directed to the vapor-phase alkylation of aromatic hydrocarbons, including aromatic hydrocarbons containing a non-polar substituent, e.g. benzene of toluene, with an alkylating agent, e.g. an olefin, wherein the alkylation is performed in the presence of a new crystalline aluminosilicate zeolite characterized by long catalyst life and being capable of affording high selectivity to desired products, e.g. alkylaromatics.

Discussion of the prior art

Alkylation of aromatic hydrocarbon compounds employing certain crystalline aluminosilicate zeolite catalysts is known in the art. For instance, U.S. Pat. 3,251,897 describes liquid phase alkylation in the presence of crystalline aluminosilicates such as faujasite, heulandite, clinoptilolite, mordenite, dachiardite, zeolite X and zeolite Y. The temeprature of such alkylation procedure does not exceed 600° F., thereby maintaining patentee's preferable operating phase as substantially liquid.

Also, U.S. Pat. 2,904,607 shows alkylation of hydrocarbon compounds in the presence of certain crystalline aluminosilicate zeolites. The zeolites described for use in this patent are crystalline metallic aluminosilicates, such as, for example, magnesium aluminosilicate.

U.S. Pats. 3,631,120 and 3,641,177 describe liquid phase processes for alkylation of aromatic hydrocarbons with olefins in the presence of certain zeolites. U.S. Pat. 3,631,120 discloses use of an ammonium exchanged, calcined zeolite having a silica to alumina mole ratio of between 4.0 and 4.9. U.S. Pat. 3,641,177 discloses use of a zeolite catalyst activated in a particular manner.

Unfortunately, while the crystalline aluminosilicate catalysts proposed for such alkylation methods provide satisfactory initial yields of desired products, for the most part, their catalytic aging properties are not sufficiently good enough to warrant commercial application. Hence, it is of advantage to provide a satisfactory process for alkylating aromatic hydrocarbons using a crystalline aluminosilicate zeolite catalyst which has improved aging properties, i.e. maintains alkylation in high yield over a long, commercially attractive period of time, heretofore lacking in the art.

SUMMARY OF THE INVENTION

This invention contemplates a process for effecting vapor-phase alkylation of aromatic hydrocarbons, including aromatic hydrocarbons containing a non-polar substituent, which comprises contacting the aromatic hydrocarbon charge with an alkylating agent under conditions effective for accomplishing said vapor-phase alkylation including a reactor inlet temperature between the critical temperature of the aromatic hydrocarbon and about 900° F. with a reactor bed temperature as much as 150° F. above the reactor inlet temperature, a pressure between atmospheric and 3000 p.s.i.g., employing a mole ratio of aromatic hydrocarbon to alkylating agent in the approximate range of 1:1 to 20:1 and a total feed weight hourly space velocity between about 20 and about 3000, in the presence of a catalyst comprising a crystalline aluminosilicate zeolite characterized by a unique specified X-ray powder diffraction pattern. The above weight hourly space velocity is based upon the weight of said crystalline aluminosilicate. The new crystalline aluminosilicate zeolite used as a catalyst in the process of this invention is represented by the general formula, expressed in terms of mole ratios of oxides, as follows:

$$1.0 \pm 0.4 M_{2/n}O : Al_2O_3 : 20\text{--}100 SiO_2 : 0\text{--}60 H_2O$$

wherein M is a cation, predominately hydrogen, and $n$ is the valence of M.

DESCRIPTION OF SPECIFIC EMBODIMENTS

The catalyst useful in this invention is known as zeolite ZSM-12. In a preferred synthesized form, the zeolite for use in the process of this invention has a formula, in terms of mole ratios of oxides, as follows:

$$1.0 \pm 0.4 M_{2/n}O : Al_2O_3 : 20\text{--}100 SiO_2 : 0\text{--}60 H_2O$$

wherein M is selected from the group consisting of a mixture of alkali metal cations, especially sodium and tetraalkylammonium cations, the alkyl groups of which preferably contain 2 to 5 carbon atoms.

The original cations are replaced, in accordance with techniques well known in the art, by ion exchange, at least in part, with hydrogen or hydrogen precursor cations. Although other cations may be used to replace the original cations, such as, for example, certain metal ions, a substantial portion of such replacing ions should be hydrogen or hydrogen precursor, such as ammonium, ions. Hydrogen ions in the finished catalyst are preferred since they render the zeolite catalytically active for alkylation of aromatic hydrocarbon compounds, such as, for example, benzene, anthracene, naphthalene and toluene.

The zeolite designated herein as ZSM-12 possesses a high degree of thermal stability thereby rendering it particularly effective for use in processes involving elevated temperatures. However, it has been found that the alkylation process of this invention may be carried out at reactor bed temperatures not in excess of about 1050° F., which eliminates many undesirable reactions that occur in catalytic alkylation of hydrocarbons carried out at higher temperatures. The deleterious effects of these reactions cause several basic problems for alkylation processes. At reactor bed temperatures substantially above 1050° F., the reactants and the alkylated products undergo degradation resulting in the loss of desired products and reactants. Undesirable residues are formed from the degradation reactions. In addition, olefins used as alkylating agents will polymerize with themselves or other reactants to form resinous compounds within the reaction zone. These resinous compounds together with the degradation products lead to the formation of coke-like deposits on the active surfaces of the catalyst. As a result, these deposits rapidly destroy the high activity of the catalyst and greatly shorten its effective life. Such undesirable effects are obviated under the conditions and with the catalyst employed in the present process.

The ZSM-12 zeolite for use in the present invention possesses a definite distinguishing crystalline structure whose X-ray diffraction pattern shows the following significant lines:

TABLE 1

| Interplanar spacing d (A.): | Relative intensity |
|---|---|
| 11.9±0.2 | M |
| 10.1±0.2 | M |
| 4.76±0.1 | W |
| 4.29±0.08 | VS |
| 4.76±0.1 | W |
| 3.98±0.08 | M |
| 3.87±0.07 | VS |
| 3.49±0.07 | W |
| 3.38±0.07 | M |
| 3.20±0.06 | W |
| 3.05±0.05 | W |
| 2.54±0.03 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and $d$ (obs.), the interplanar spacing in A, corresponding to the recorded lines, were calculated. In Table 1 the relative intensities are given in terms of the symbols W=weak, M=medium and VS=very strong. It should be understood that this X-ray diffraction pattern is characteristic of all the species of ZSM-12 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

Zeolite ZSM-12 can be suitably prepared by preparing a solution containing tetraethylammonium cations, sodium oxide, an oxide of aluminum, an oxide of silicon and water and having a composition, in terms of mole ratios of oxides, falling within the following ranges:

TABLE 2

| | Broad | Preferred |
|---|---|---|
| $OH^-/SiO_2$ | 0.10–0.40 | 0.15–0.25 |
| $R_4N^+/(R_4N^+ + Na^+)$ | 0.2–0.95 | 0.28–0.90 |
| $H_2O/OH^-$ | 20–300 | 5.0–100 |
| $SiO_2/Al_2O_3$ | 20–200 | 20–125 | wherein R is ethyl and maintaining the mixture until crystals of the zeolite are formed. Thereafter, the crystals are separated from the liquid and recovered. Typical reaction conditions consist of heating the foregoing reaction mixture to a temperature of from about 80° C. to 180° C. for a period of time of from about six hours to 150 days. A more preferred temperature range is from about 150° C. to 170° C. with the amount of time at a temperature in such range being from about 5 days to 12 days.

ZSM-12 is preferentially synthesized from a mixture containing a high silica to alumina ratio of, for example, more than 85 to 1, especially at crystallization temperatures of 212° F. At this temperature, if the silica to alumina ratio drops to 50, conditions favor the formation of beta zeolite.

When the reaction product of triethylamine and diethylsulfate is used in the synthesis of ZSM-12, temperatures of under 175° C. should be maintained. Higher temperatures favor the formation of other zeolites.

The digestion of the gel particles is carried out until crystals form. The solid product is separated from the reaction medium, as by cooling to room temperature, filtering and water washing.

The foregoing product is dried, e.g. at 230° F. for from about 16 to 24 hours. Of course, milder conditions may be employed if desired, e.g. room temperature under vacuum.

ZSM-12 can be prepared utilizing materials which supply the appropriate oxide. Such compositions include sodium aluminate, alumina, sodium silicate, silica hydrosol, silica gel, silicic acid, sodium hydroxide and tetraethylammonium compounds, e.g. tetraethylammonium bromide. It will be understood that each oxide component utilized in the reaction mixture for preparing the ZSM-12 zeolite can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by tetraethylammonium hydroxide, tetraethylammonium bromide or by a mixture of diethylsulfate and triethylamine. The reaction mixture can be prepared either batchwise or continuously. Crystal size and crystallization time of the ZSM-12 composition will vary with the nature of the reaction mixture employed.

For th alkylation process of this invention, if desired, the ZSM-12 zeolite catalyst can be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite and kieselguhr. The relative proportion of crystalline aluminosilicate ZSM-12 of the total composition of catalyst and binder or support may vary widely with the ZSM-12 content ranging from between about 1 to about 90 percent by weight and more usually in the range of about 2 to about 80 percent by weight of the composition.

Exemplary of the hydrocarbons which may be alkylated by the process of this invention are aromatic compounds such as benzenes, naphthalenes, anthracenes, and the like and substituted derivatives thereof; and alkyl substituted aromatics, e.g. toluene, xylene, and homologs thereof. In addition, other non-polar substituent groups may also be attached to the nucleus of the aromatic ring including by way of example Methyl ($-CH_3$)
Ethyl ($-C_2H_5$)
Tert-butyl ($-C(CH_3)_3$)
Alkyl ($-C_nH_{(2n+1)}$)
Cycloalkyl ($-C_nH_{(2n-1)}$)
Phenyl ($C_6H_5$)
Naphthyl ($C_{10}H_7$) and
Aryl (any aromatic radical)

In accordance with this invention, the preferred alkylating agents are olefins such as ethylene, propylene, dodecylene, as well as formaldehyde, alkyl halides and alcohols; the alkyl portion thereof having from 1 to 24 carbon atoms. Numerous other acyclic compounds having at least one reactive alkyl radical may be utilized as alkylating agents.

Operating conditions employed in the process of the present invention are critical and will be dependent, at least in part, on the specific alkylation reaction being effected. Such conditions as temperatures, pressure, space velocity and molar ratio of the reactants and the presence of inert diluents will have important affects on the process. Accordingly, the manner in which these conditions affect not only the conversion and distribution of the resulting alkylated products but also the rate of deactivation of the catalyst will be described below.

The process of this invention is conducted such that alkylation of an aromatic hydrocarbon compound, exemplified by benzene, with an alkylating agent, such as an olefin, exemplified by propylene, is carried out in the vapor-phase by contact in a reaction zone, such as, for example, a fixed bed of catalyst, under alkylation effective conditions, said catalyst being characterized as the above-defined ZSM-12 which has been hydrogen exchanged such that a predominate portion of its exchangeable cations are hydrogen ions. In general, it is contemplated that more than 50 percent and preferably more than 75 percent of the cationic sites of the ZSM-12 zeolite will be occupied by hydrogen ions. The alkylatable aromatic compound and alkylating agent are desirably fed to a first stage at an appropriate mole ratio of one to the other. The feed to such first stage is heated. After some reaction takes place, such as, for example, when about 80 percent of the alkylating agent is consumed, the effluent of the first stage is cooled to remove heat of reaction and more alklating agent is added (second stage) to maintain the mole ratio of aromatic compound to alkylating agent within the range established for the first stage. A plurality of reaction stages is possible.

Although cooling between reactor stages may be accomplished in many ways, the preferred method is by quenching with condensed reactor effluent.

Considering vapor-phase alkylation of benzene with propylene, the first stage mole ratio of benzene to propylene may be in the range of about 1:1 to about 20:1. The first stage feed is heated to a reactor inlet temperature within the range of the critical temperature of the aromatic hydrocarbon to about 900° F. at a pressure within the range of about atmospheric to about 3000 p.s.i.g. Preferred inlet temperatures fall within the range of about 600° F. to about 850° F. and preferred pressures fall within the range of about 25 p.s.i.g. to about 450 p.s.i.g. The repeating of reaction staging is carried out while maintaining an overall aromatic hydrocarbon, e.g. benzene, to alkylating agent, e.g. propylene, mole ratio of about 1:1 to about 20:1 with a preferred range of about 2.5:1 to about 16:1. As the reaction proceeds through the stages, the aromatic hydrocarbon to alkylating agent mole ratio increases.

A multi-stage condensation of the reactor product is desired since a quench containing a higher concentration of benzene than the combined reactor effluent is possible. The condensed reactor effluent not used as a quench may be fed to a series of distillation columns.

It is noted that extremely high total feed space velocities are possible in the process of this invention, i.e. up to 3000 lb. total feed/hr.-lb. crystalline aluminosilicate. An important factor in the present process is, however, the weight hourly space velocity (WHSV) of the alkylating agent, e.g. propylene. The alkylating agent WHSV to each of any alkylation reactor stages is maintained between about 1 and about 10 lb. alkylating agent/hr.-lb. crystalline aluminosilicate. The most desirable propylene, i.e. alkylating agent, WHSV is within the range of about 2 to about 6 lb. propylene/hr.-lb. crystalline aluminosilicate. When the propylene WHSV is maintained within the above limits, an economical cycle between regenerations of catalyst exists.

The following examples will serve to illustrate the process of the invention, without unduly limiting same.

EXAMPLE 1

Preparation of ZSM-12

A solution of 96.2 gms. tetraethylammonium bromide and 17.5 gms. NaOH in 300 gms. $H_2O$ was made. 5.0 gms. of $NaAl_2$ (41.8% $Al_2O_3$) were dissolved in the solution. 500 gms. of colloidal silica, e.g. Ludox, were added to the solution and mixed for 15 minutes. The resulting mixture was crystallized in a polypropylene jar without agitation for 84 days at 212° F. The product analysis by X-ray diffraction was ZSM-12 type material with a $SiO_2/Al_2O$ of 82. The product was washed and dried at 230° F. The dry powder was precalcined three hours at 700° F. in air then cooled to room temperature in a dessicator. This was followed by four contacts each with ten ml. of 5% $NH_4Cl$/gm. of calcined powder at 195° F. for one hour. Each contact was made with stirring. The product was washed free of $Cl^-$ ions at room temperature then dried at 230° F. The sodium content at this stage was less than 0.01%. The dried powder was then calcined by heating it in air at 2° F./min. to 1000° F. then ten hours at 1000° F. The product was then cooled in a dessicator.

Alkylation of benzene to cumene over ZSM-12

Over a fixed bed of the above-described ZSM-12 catalyst a feed of benzene was contacted with the alkylating agent propylene in the mole ratio of benzene to propylene of 3.4:1. The reactor inlet temperature was 550° F. and the reactor pressure was maintained at 50 p.s.i.g. The total feed weight hourly space velocity was 300. After 40 hours on stream, a total product was obtained which analyzed as follows:

| Component: | Wt. percent total product |
|---|---|
| Propylene | 1.6 |
| Benzene | 64.9 |
| Cumene | 27.8 |
| n-Propylbenzene | <0.1 |
| Di-isopropylbenzene | 4.4 |
| Other | 1.4 |

EXAMPLE 2

Alkylation of benzene to ethylbenzene over ZSM-12

Over fiixed bed of ZSM-12 catalyst prepared as in Example 1 a feed of benzene was contacted with the alkylating agent ethylene in the mole ratio of benzene to ethylene of about 3.1:1. The reactor inlet temperature was varied over the range of 600 to 725° F. in increments of 25° with the reactor pressure being maintained at 50 p.s.i.g. The total feed weight hourly space velocity was 100. The composition of the liquid product evaluated at the above temperature increments was as follows:

| Component | Wt. percent total product | | | | | |
|---|---|---|---|---|---|---|
| | 600° F. | 625° F. | 650° F. | 675° F. | 700° F. | 725° F. |
| Benzene | 89.0 | 85.0 | 84.0 | 82.0 | 80.0 | 77.0 |
| Ethylbenzene | 9.0 | 12.0 | 13.0 | 14.0 | 15.5 | 18.0 |
| Polyethylbenzene | 1.5 | 2.0 | 2.5 | 3.0 | 4.0 | 4.5 |
| Other [1] | 0.5 | 1.0 | 0.5 | 1.0 | 0.5 | 0.5 |

[1] Composed mostly of light ends and ethylene (less than 0.1 wt percent total product).

EXAMPLE 3

Alkylation of benzene to cumene over ZSM-12

Over a fixed bed of ZSM-12 catalyst prepared as in Example 1 a feed of benzene was contacted with the alkylating agent propylene in the mole ratios of benzene to ethylene incremented over the range 3.4:1 to 6.6:1. In all cases the reactor inlet temperature was 550° F. and the reactor pressure was maintained at 50 p.s.i.g. The total feed weight hourly space velocity was 300 for each case of mole ratio of benzene to ethylene. The composition of the liquid product evaluated at each ratio increment was as follows:

| | Wt. percent total product | | |
|---|---|---|---|
| | Cumene | Di-isopropyl-benzene | n-Propyl benzene |
| Mole ratio Benzene to propylene: | | | |
| 3.4:1 | 28.0 | 4.0 | Trace. |
| 4.5:1 | 25.0 | 3.5 | Do. |
| 6.6:1 | 19.0 | 2.0 | Do. |

EXAMPLE 4

Alkylation of toluene to cymene over ZSM–12

Over a fixed bed of ZSM–12 catalyst prepared as in Example 1 a feed of toluene was contacted with the alkylating agent propylene in the mole ratio of toluene to propylene of 5.6:1. The reactor inlet temperature was 550° F. and the reactor pressure was maintained at 50 p.s.i.g. The total feed weight hourly space velocity was 300. After 24 hours on stream, a total product was obtained which analyzed as follows:

| Component: | Wt. percent total Product |
|---|---|
| Propylene | 1.0 |
| Toluene | 79.0 |
| Cymene* | 20.0 |
| n-Propyltoluene | 0.1 |
| Others | 0.1 |

*Total cymene isomers.

EXAMPLE 5

Alkylation of toluene to cymene over ZSM–12

Over a fixed bed of ZSM–12 catalyst prepared as in Example 1 a feed of toluene was contacted with the alkylating agent propylene in the mole ratio of 3.8:1. The reactor inlet temperature and reactor pressure were 600° F. and 50 p.s.i.g. The total feed weight hourly space velocity was 300. The total product obtained from this process contained 26.0 wt. percent cymene isomers.

EXAMPLE 6

Alkylation of toluene to xylenes over ZSM–12

Over a fixed bed of ZSM–12 catalyst prepared as in Example 1 a feed of toluene was contacted with the alkylating agent methanol in the mole ratio of toluene to methanol of 2:1. The reactor inlet temperature was 700° F. and the reactor pressure was maintained at 50 p.s.i.g. The total feed weight hourly space velocity was 50. After 24 hours on stream, a total product was obtained which analyzed as follows:

| Component | Wt. percent total product |
|---|---|
| Toluene | 83.5 |
| p-Xylene | 2.9 |
| M-Xylene | 4.2 |
| O-Xylene | 8.4 |
| Products lighter than toluene | 1.0 |

It will be noted from the examples of this invention that the vapor-phase alkylation of aromatic hydrocarbon compounds by contacting with the hydrogen ZSM-12 catalyst provides certain substantial benefits. The advantages and improvements achieved by the process of this invention over the art are evident. They may be listed as follows:

(1) Pretreatment and drying of feed is not necessary.
(2) Extremely high space velocities are possible. This leads to higher yields with smaller reactors.
(3) Temperature control by product quenching is feasible.
(4) Selectivity to desired products is good.

It will be appreciated that the examples set forth above are merely illustrative and that aromatic hydrocarbons, including aromatic hydrocarbons containing a non-polar substituent, may be alkylated in accordance with the present invention.

It will also be appreciated that the operating conditions for the alkylation reactions in accordance with the process of this invention, as exemplified in the foregoing examples, may be varied within the limits specified so that the process may be conducted in vapor-phase, depending on product distribution, degree of alkylation, rate of catalyst deactivation, and operating pressures and temperatures, and that various modifications and alterations may be made in the process of this invention without departing from the spirit and scope thereof.

What is claimed is:

1. A process for effecting vapor-phase alkylation of an organic hydrocarbon charge selected from the group consisting of aromatic hydrocarbons and aromatic hydrocarbons containing a non-polar substituent which comprises contacting said hydrocarbon charge with an alkylating agent under conditions effective for accomplishing said vapor-phase alkylation including a reactor inlet temperature between the critical temperature of the aromatic hydrocarbon and about 900° F., a pressure between atmospheric and about 3000 p.s.i.g., employing a mole ratio of hydrocarbon feed to alkylating agent in the approximate range of 1:1 to 20:1 and a total feed weight hourly space velocity between about 20 and 3000 in the presence of a catalyst comprising a crystalline aluminosilicate zeolite characterized by the X-ray diffraction pattern substantially that of Table 1 and a formula, expressed in terms of mole ratios of oxides, as follows:

$$1.0 \pm 0.4 \; M_{2/n}O:Al_2O_3:20\text{--}100SiO_2:0\text{--}60H_2O$$

wherein M is a cation, predominately hydrogen, and $n$ is the valence of M, said space velocity being based upon the weight of said crystalline aluminosilicate.

2. The process of claim 1 wherein the reactor inlet temperature is being about 600° F. and about 850° F. and the reaction pressure is between about 25 and about 450 p.s.i.g.

3. The process of claim 1 wherein the crystalline aluminosilicate zeolite is combined in an amount between about 1 and about 90 weight percent in a binder therefor.

4. The process of claim 3 wherein said binder is alumina.

5. The process of claim 1 wherein said alkylating agent is an olefin.

6. The process of claim 5 wherein said olefin is selected from the group consisting of ethylene and propylene and the organic hydrocarbon charge is selected from the group consisting of benzene and toluene.

7. The process of claim 6 wherein the reaction temperature is between about 600° F. and about 850° F. and the reaction pressure is between about 25 and about 450 p.s.i.g.

8. The process of claim 6 wherein the crystalline aluminosilicate zeolite is combined in an amount between about 1 and about 90 weight percent in a binder therefor.

9. The process of claim 8 wherein the crystalline aluminosilicate zeolite is combined in an amount between about 2 and about 80 weight percent in a binder therefor.

10. The process of claim 9 wherein said binder is alumina.

References Cited

UNITED STATES PATENTS

| | | | |
|---|---|---|---|
| 3,758,723 | 5/1971 | Bowes et al. | 260—672 T |
| 3,660,309 | 5/1972 | Hayes et al. | 252—455 Z |
| 3,677,973 | 7/1972 | Mitsche et al. | 252—455 Z |

CURTIS R. DAVIS, Primary Examiner

U.S. Cl. X.R.

260—671 C, 671 P; 252—455 Z

UNITED STATES PATENT OFFICE
CERTIFICATE OF CORRECTION

Patent No. 3,755,483                     Dated August 28, 1973

Inventor(s) GEORGE THOMAS BURRESS

It is certified that error appears in the above-identified patent and that said Letters Patent are hereby corrected as shown below:

Column 3, line 9       "4.76 ± 0.1 --------W" should be deleted.

Column 4, line 19      "th" should be --the--.

Claim 2, Column 8, line 2      "being" should be --between--.

Column 1, line 5       "Mobile Oil Corporation" should be -- Mobil Oil Corporation --.

Signed and sealed this 27th day of November 1973.

SEAL)
ttest:

DWARD M. FLETCHER, JR.                RENE D. TEGTMEYER
ttesting Officer                      Acting Commissioner of Patents